R. A. BROOKS.
ADJUSTABLE SECTION AND RETREAD MOLD FOR PNEUMATIC TIRES.
APPLICATION FILED JUNE 14, 1920.
1,368,478.
Patented Feb. 15, 1921.
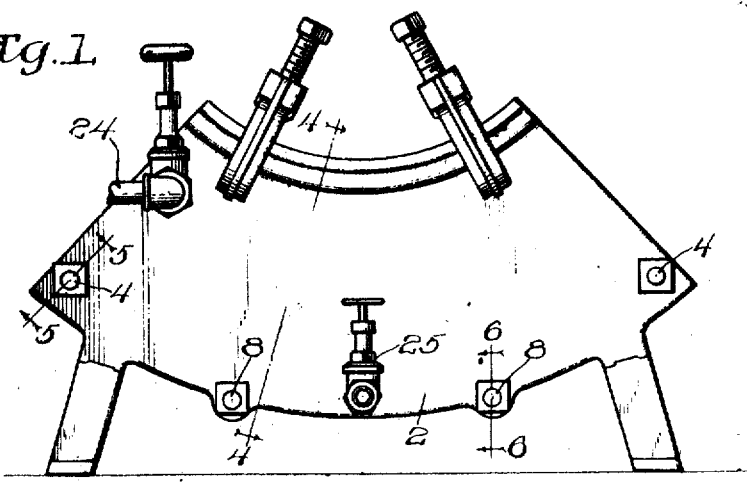
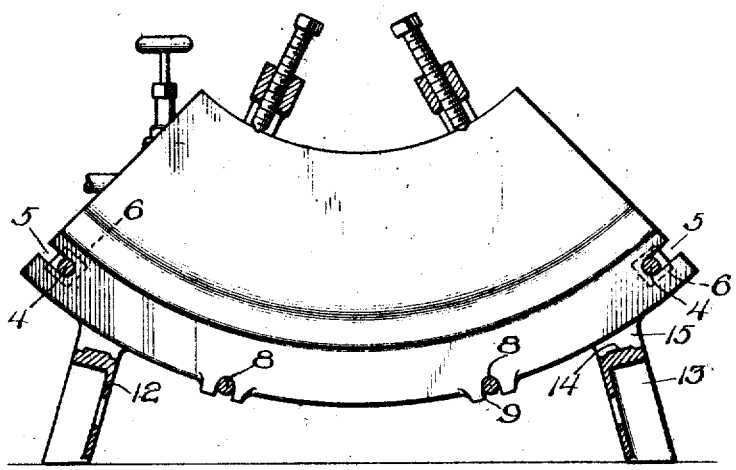

R. A. BROOKS.
ADJUSTABLE SECTION AND RETREAD MOLD FOR PNEUMATIC TIRES.
APPLICATION FILED JUNE 14, 1920.
1,368,478.
Patented Feb. 15, 1921.
3 SHEETS—SHEET 2.
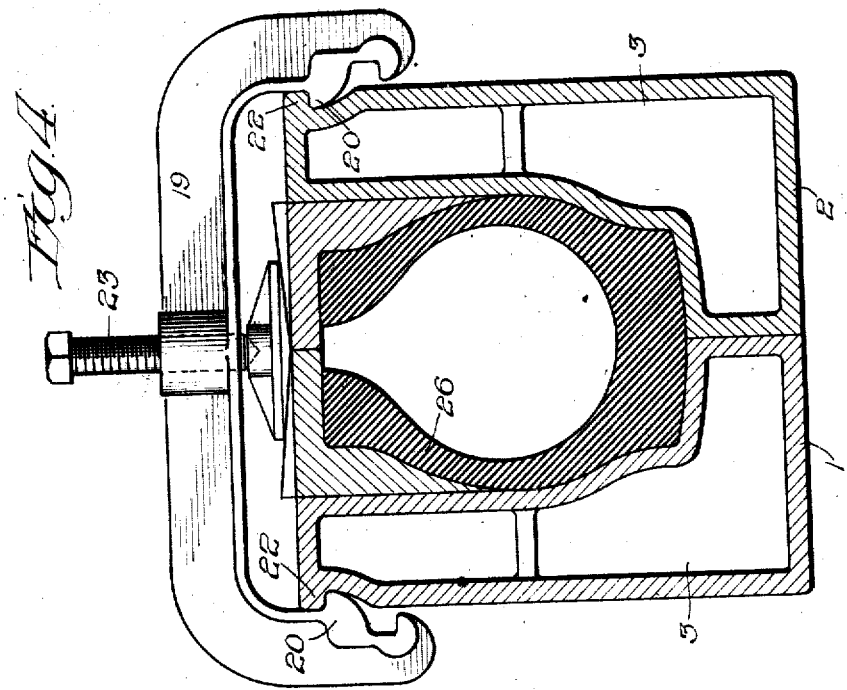
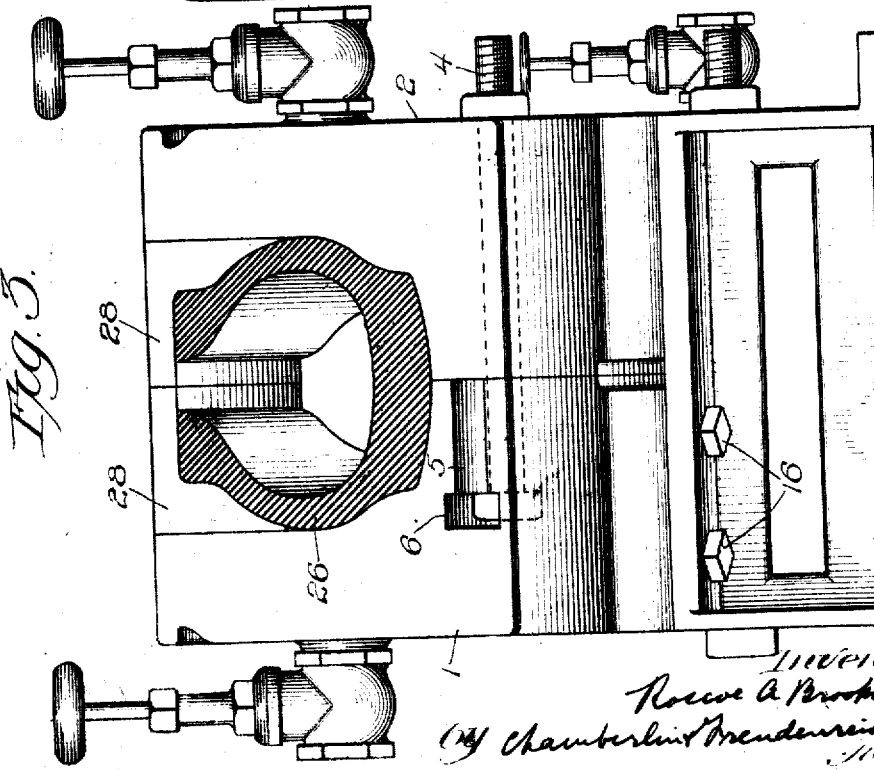

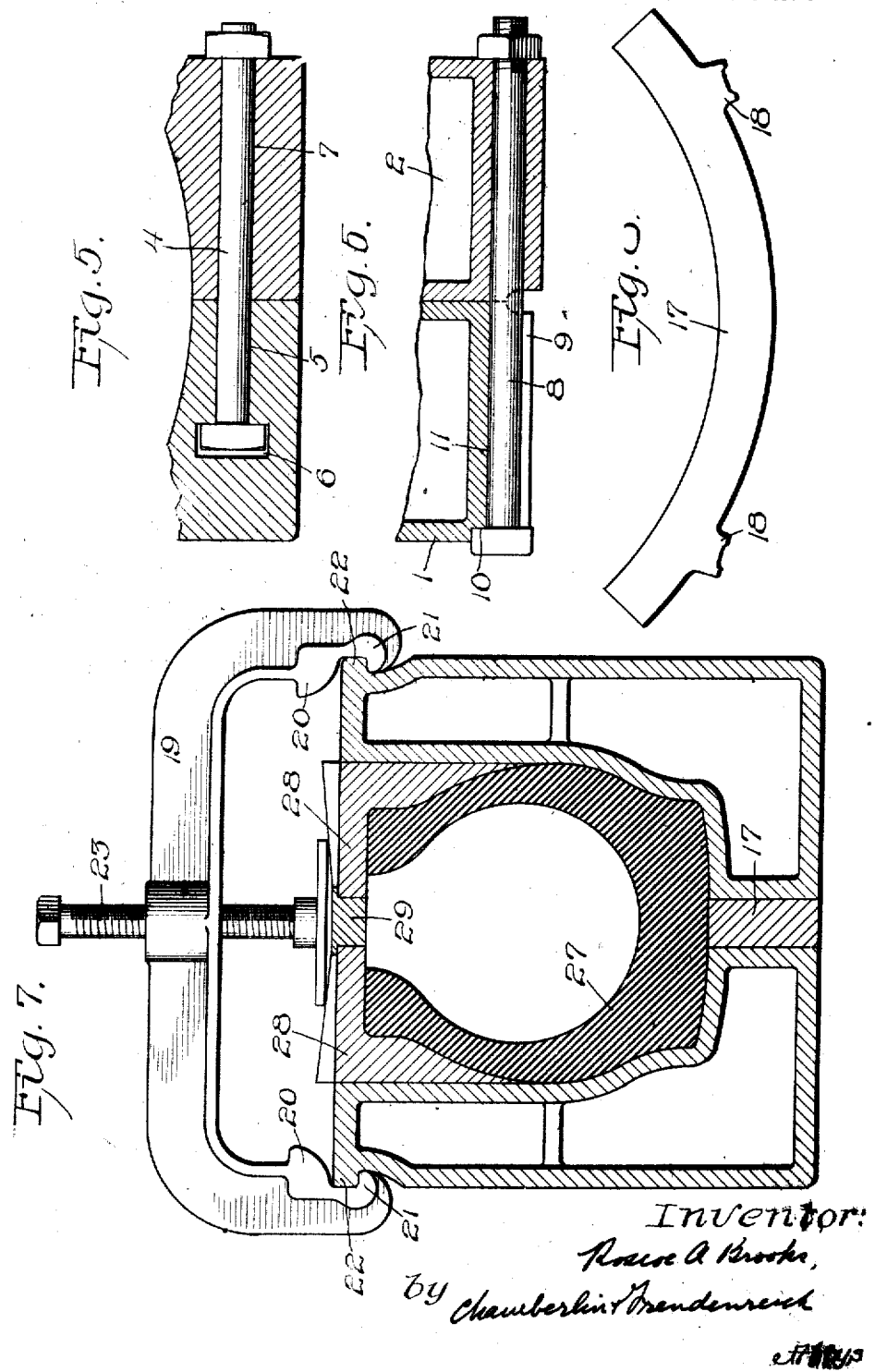

UNITED STATES PATENT OFFICE.

ROSCOE A. BROOKS, OF CHICAGO, ILLINOIS, ASSIGNOR, BY MESNE ASSIGNMENTS, TO WESTERN RUBBER MOLD COMPANY, A CORPORATION OF ILLINOIS.

ADJUSTABLE SECTION AND RETREAD-MOLD FOR PNEUMATIC TIRES.

1,368,478.  Specification of Letters Patent.  Patented Feb. 15, 1921.

Application filed June 14, 1920. Serial No. 388,752.

*To all whom it may concern:*

Be it known that I, ROSCOE A. BROOKS, a citizen of the United States, residing at Chicago, county of Cook, State of Illinois, have invented a certain new and useful Improvement in Adjustable Sections and Retread-Molds for Pneumatic Tires, and declare the following to be a full, clear, and exact description of the same, such as will enable others skilled in the art to which it pertains to make and use the same, reference being had to the accompanying drawings, which form a part of this specification.

My invention has for its object to produce a mold for curing the rubber in retreading or for other purposes in pneumatic tires, which shall be simple in construction, comparatively cheap to manufacture, and adjustable to various sizes of tires without the aid of reducing shells.

In carrying out my invention I construct a mold of two similar halves separated along a plane at right angles to the axis of curvature, making each section or half hollow so as to produce two independent steam chests, and provide spacers of good heat conducting material between the meeting edges of the two halves to adapt them to larger size tires. Therefore, viewed in other of its aspects, my invention may be said to have for its objects to produce a simple and novel sectional mold which may be adjusted without disadvantageously affecting the distribution of the heat over the work to be treated, and to produce a mold one portion of which may be heated to a higher temperature than another in cases where this may be found to be desirable.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a side view of a mold arranged in accordance with my invention;

Fig. 2 is a vertical central section through the mold in the plane of separation between the two halves;

Fig. 3 is an end view of the mold on an enlarged scale, the clamps across the top being omitted and a tire being shown in section therein;

Fig. 4 is a section on the same scale as Fig. 3, taken approximately on line 4—4 of Fig. 1, there being a tire in the mold;

Fig. 5 is a section taken approximately on line 5—5 of Fig. 1, on the same scale as Figs. 3 and 4;

Fig. 6 is a section taken approximately on line 6—6 of Fig. 1, on the same scale as Figs. 3, 4 and 5;

Fig. 7 is a view similar to Fig. 4, showing the mold adjusted to a larger tire than in Fig. 4; and Fig. 8 is a side elevation of the spacer employed between the meeting edges of the mold sections in Fig. 7.

Referring to the drawings, 1 and 2 represent two mold sections which, when placed edge to edge, form an open-ended trough having a cross sectional contour of a pneumatic tire and curved longitudinally on approximately the radius of such tire. In the arrangement shown, the mold is adapted for use in treating large pneumatic truck tires and the cross sectional contour is therefore such as will commonly be found in tires of this kind; but it will of course be understood that my invention is not limited to any particular contour. The two halves of the mold, except for slight details to be hereinafter pointed out, are just alike and they may conveniently be produced by first making a ring having the desired cross sectional shape, and then cutting the ring into sections along radial lines. In the arrangement shown, each section has an angular length of ninety degrees and therefore after a ring has been formed and finished on those surfaces which require machining, it is simply cut into four equal sections which, when placed together in pairs, will produce two complete molds. The sections of the mold are made hollow, as indicated at 3, so that each section constitutes an independent steam chest extending along one side of the tire to be treated and across one-half of the width of the tread surface. In manufacturing the mold sections as heretofore explained, the ring may conveniently take the form of a hollow casting having transverse partitions so spaced that when the ring is divided along planes cutting these partitions, each partition will form an end wall for each of two sections. The two sections of the mold are detachably connected together in any suitable way which will hold them rigid and at the same time permit them to be readily assembled or separated from each other. This may conveniently be accomplished by means of a few bolts, four of which are employed in the construction illustrated. The parts are preferably so constructed that the bolts may be inserted in one of the sections by a simple lateral movement, resting in seats which will prevent them from rotating, the free ends of the bolts being inserted through holes in the other sections, whereby they will be held in place until the nuts can be screwed on. Two of the bolts, 4, 4, are preferably placed at the ends of the mold below the bottom of the trough therein. These bolts are attached to the member 1 by simply inserting them laterally into suitably shaped recesses, 5, opening out through the ends of the molds and provided with portions, 6, shaped to receive the bolt heads and prevent the bolts from turning. The member 2 has simple holes, 7, formed through the same in registration with the inner portions of the recesses. Two other bolts, 8, 8, extend across the bottom of the mold, the heads of these bolts and the adjacent portions of the bolts themselves being inserted into downwardly-opening recesses, 9, in the member 1, as best shown in Fig. 6, said recesses having end portions, 10, to receive the bolt heads. The member 2 is provided with simple holes, 11, registering with the recesses, 9. The only difference between the two mold sections is in the provision of means for receiving the bolts.

The two mold sections rest upon suitable feet or standards, 12 and 13. The top surfaces, 14, of the feet or standards are preferably machined so as to make their longitudinal elements, that is lines extending at right angles to the plane of separation between the two halves of the mold, straight lines. The mold sections are preferably provided with slight projections or lugs, 15, which are also machined so as to fit accurately on the top faces of the feet. If desired, either the feet or the lugs, 15, may be ribbed so as to cause the feet to interlock with the mold sections and hold the latter against relative displacement in the circumferential direction. One of the mold sections, preferably the member 1, is rigidly attached to the feet as, for example, by means of bolts, 16, while the other mold section simply rests on the feet. Therefore, in assembling the parts of the mold, one of the sections is bolted to the feet, the bolts 4 and 8 are slipped in place, and the other section is then set on the feet and slid along the same until it engages the co-operating section, the bolts passing through the holes provided therefor; and then by screwing the nuts tightly on the free ends of the bolts, the mold is clamped into a single unitary structure.

When it is desired to treat a tire too large to go into the trough of the mold, a liner or spacing strip, 17, is placed between the meeting edges of the mold sections as illustrated in Fig. 7. The member 17 preferably has downwardly-projecting lugs, 18, shaped to fit upon the top surfaces of the feet in the same manner as the lugs or projections, 15, and its upper edge is curved to conform with the curvature of the bottom of the trough in the mold. The spacing device is simply set on the feet beside the stationary member of the mold before the movable member is attached; the bolts 4 and 8 being made long enough to permit the two halves of the mold to be fastened together with the spacer between them. The spacer is made of a good conducting material and consequently the heat from the steam chests will quickly pass into the same so as to give the same curing effect along that strip of a tire in contact with the spacer as at other points.

The general practice in the use of tire molds is to provide clamps carrying screws which will enter the mold and engage with the work so as to press it against the hot walls. I have provided for this purpose one or more simple U-shaped members, 19, having on the arms thereof a plurality of pairs of inwardly-projecting lugs, two such pairs, indicated at 20, 20 and 21, 21, being illustrated. The lugs, 21, are nearest the free ends of the arms of the clamp and are spaced farther apart than the lugs 20 which are nearer the cross member of the clamp. Each of the mold sections is provided along the upper outer edge with an outwardly-projecting flange, 22, extending throughout the length of the same. When the mold is being used without a spacer, the lugs, 20, on the clamp will engage with these flanges, as illustrated in Fig. 4, while, when the spacer is being used, so that the width across the top of the mold is greater than when the spacer is not used, the lugs, 21, of the clamp engage with these flanges as shown in Fig. 7. The clamps are placed in position by sliding them upon the mold from the end of the latter. Each clamp is provided at the center with a screw, 23, extending parallel with the arms thereof, this screw serving to produce the requisite pressure on the work in the mold.

The mold is heated by steam, each half being provided with a valved inlet, 24, and a valved outlet, 25, so that the temperature in one-half may be regulated independently of the other half.

In Figs. 3 and 4, 26 represents a tire in the mold while in Fig. 7 a larger tire is indicated at 27. After the tire has been placed in position, suitable metal bead plates, 28, 28, are laid in the mold upon the same. In the case of the larger tire, a spacer, 29, of the same width or thickness as the thickness of the spacer, 17, is placed between the bead plates.

It will thus be seen that I have produced a simple and novel mold in which the temperature in one portion may be varied independently of another portion, in which the walls of the trough are efficiently heated throughout their entire extent, and which may be adjusted to fit various sizes of tires without interposing a shell or the like between the work and the mold proper and thus changing the heating characteristics of the mold.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:—

1. A tire mold in the form of a trough divided into two parts along a longitudinal plane passing through the bottom of the trough, a support arranged under said mold and beneath both parts thereof, one of said parts being fixed to the support, the other part having a sliding engagement with said support adapted to permit it to be moved laterally from and toward the other part, a spacer adapted to rest on said support between the meeting edges of the divided bottom of the trough with its upper edge forming a continuation of the contour of the mold cavity, bolts at the bottom of the mold for detachably securing said parts together either with the spacer in position or with the spacer left out, and a U-shaped clamp adapted to straddle the top of the mold, said clamp having two sets of mold-engaging faces at the inner sides of its arms spaced apart lengthwise of the arms of the clamp, and the distance between the faces of the set nearest the free ends of the arms being greater than the distance between the faces of the other set.

2. A tire mold in the form of a trough divided into two parts along a longitudinal plane passing through the bottom of the trough, a detachable spacer adapted to fit between the meeting edges of the divided trough bottom to increase the width of the mold cavity, and bolts connecting the two halves of the trough together at the bottom, said bolts being located in position to pass underneath the spacer so as to permit the spacer to be placed in position and removed without removing the bolts.

3. A tire mold in the form of a trough divided into two parts along a longitudinal plane passing through the bottom of the trough, a detachable spacer adapted to fit between the meeting edges of the divided trough bottom to increase the width of the mold cavity, bolts extending between the two parts of the trough near the bottom thereof to secure them together, the bolts being of sufficient length to permit the insertion of the spacer when desired, and a U-shaped clamp adapted to straddle the top of the mold, said clamp having two sets of mold-engaging faces on the inner side of its arms spaced apart lengthwise of the arms, and the distance between the faces of the set nearest the free ends of the arms being greater than the distance between the faces of the other set.

4. A tire mold in the form of a trough divided into two parts along a longitudinal plane passing through the bottom of the trough, a detachable spacer adapted to fit between the meeting edges of the divided trough bottom to increase the width of the mold cavity, bolts extending between the two parts of the trough near the bottom thereof to secure them together, the bolts being of sufficient length to permit the insertion of the spacer when desired, the mold having outwardly-directed flanges at opposite sides thereof near the top, and a U-shaped clamp adapted to straddle the top of the mold and having on the inner sides of its arms two inwardly-directed sets of hooks, the set of hooks nearest the free ends of the arms of the clamp being so spaced that they are adapted to be engaged underneath the aforesaid flanges when the spacer is in the mold, and the hooks of the other set being so spaced as to permit them to be engaged underneath said flanges and hold the top of the mold from spreading when the spacer is omitted.

In testimony whereof, I sign this specification.

ROSCOE A. BROOKS.